Figure 1:
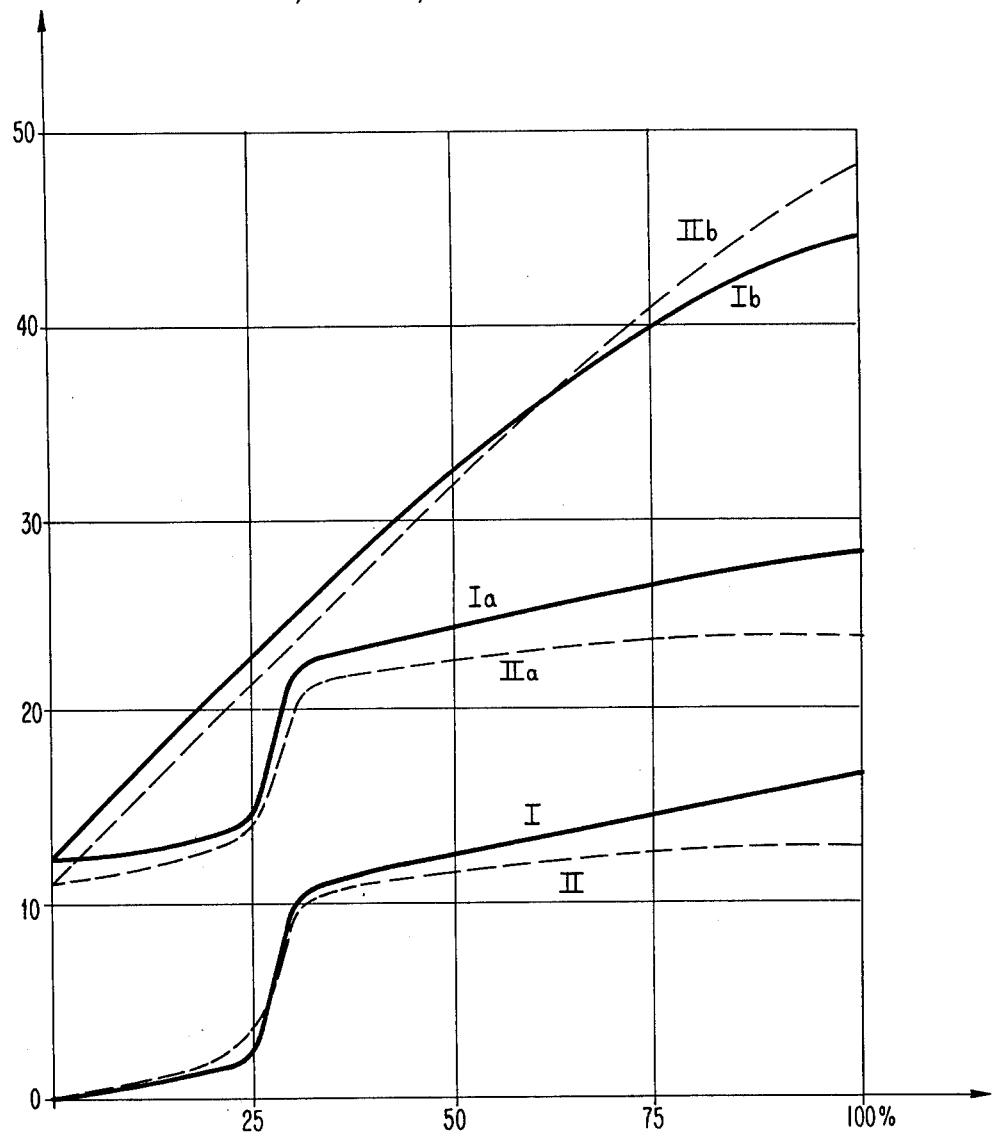

United States Patent [19]

Pons

[11] 4,028,131

[45] June 7, 1977

[54] RAW MATERIALS FOR GLASS MAKING AND METHOD OF MAKING THEM

[75] Inventor: Andre Pons, Villejuif, France

[73] Assignee: Saint-Gobain Industries, Neuilly sur Seine, France

[22] Filed: May 31, 1974

[21] Appl. No.: 475,201

Related U.S. Application Data

[63] Continuation of Ser. No. 258,423, May 31, 1972, abandoned, which is a continuation-in-part of Ser. No. 792,261, Jan. 21, 1969, abandoned.

[30] Foreign Application Priority Data

Jan. 23, 1968   France .......................... 68.137060

[52] U.S. Cl. ............................ 106/52; 106/DIG. 8
[51] Int. Cl.² ...................................... C03C 3/04
[58] Field of Search ....................... 106/52, DIG. 8

[56] References Cited

UNITED STATES PATENTS

| | | | |
|---|---|---|---|
| 2,869,985 | 1/1959 | Gooding, Jr. et al. | 106/52 |
| 3,489,578 | 1/1970 | Pugh | 106/52 |
| 3,542,534 | 11/1970 | Yamamoto | 106/52 |
| 3,573,887 | 4/1971 | Mod et al. | 106/52 |

FOREIGN PATENTS OR APPLICATIONS 1,034   1852   United Kingdom ................. 106/53

*Primary Examiner*—Winston A. Douglas
*Assistant Examiner*—Mark Bell
*Attorney, Agent, or Firm*—Pennie & Edmonds

[57] ABSTRACT

This invention produces a batch of raw materials for glass making having a greatly increased speed of fusion and fining, by mixing a glass sand with quicklime and/or calcined dolomite and with caustic alkali with or without alkali metal salts. The batch may be made as a powder, a paste or may be formed into granules and dried. The batches can be stored without hardening.

5 Claims, 2 Drawing Figures

RAW MATERIALS FOR GLASS MAKING AND METHOD OF MAKING THEM

This application is a continuation of application Ser. No. 258,423, filed May 31, 1972, now abandoned, which is a continuation in part of application Ser. No. 792,261, filed Jan. 21, 1969, now abandoned.

This invention relates to the preparation of the batches of raw material which are melted and then fined to make glass. The invention is valuable in producing batches of raw materials for making silicious glasses. These glasses have been made by melting finely divided silica sand, limestone or dolomite limestone and sodium carbonate or sodium sulfate. These glasses may include minor amounts of other oxides such as aluminum, magnesium, lead, or boron and the like.

The melting of glass involves the melting of large quantities, often running into the hundreds of tons of material, in a single furnace. The time and heat required is high as the materials do not readily fuse to produce the molten glass and the glass once molten must be maintained as a liquid to complete the fining which includes the blending of the glass and the elimination of the bubbles of gases released by the decomposition of the limestone and the sodium salts. The present invention is directed to the preparation of batches of raw material for introduction into the furnaces. The batches as prepared by the present invention melt faster and fine faster than the batches of the prior art. It should be born in mind that glasses are not made from the oxides per se but are made from pulverized rock which may be salts such as carbonates and sulfates which are decomposed during the formation of the glass releasing gases such as water, carbon dioxide and the sulfur oxides, which must escape from the glass melt.

It has been recently proposed to accelerate the melting and fining of glass by substituting alkaline earth oxides per se, such as found in quicklime and calcined dolomite for the alkaline earth carbonate found in raw limestone and dolomite. These oxides are prepared by the calcining of the natural alkaline earth carbonates in limestone and dolomite. Tests of this process have shown that under particular conditions the fusion is accelerated and there are undesirable side effects which makes the use of the process uneconomical. The results of the process are variable. The substitution is generally useful only if the quicklime or the calcined dolomite is carefully sized to limited granulometry. This sizing not only wastes material but also gives rise to dusts which are undesirable and which are injurious to the health of the personnel. In one test in a glass containing only calcium oxide, the usual lime stone was replaced with a quicklime having a granulometry of less than one millimeter and an increase in speed of fusion of 20% was obtained. In another test of a glass the dolomite supplying both calcium oxide and magnesium oxide was replaced by calcined dolomite of the same granulometry and the speed of fusion was increased only about 12%. The tests that have been conducted show that the substitution of the calcined limestone and dolomite do not contribute to homogeneity of the glass. The tests have also shown that in order to secure adequate fining of the glass, it is necessary to eliminate all particles of the quicklime and calcined dolomite having a size less than 0.1 mm. The crushing and sizing essential to the production of the calcined material of proper size range produces large quantities of dust. This dust has no utility in the process and being highly reactive is dangerous to the health of the workers and an ecological menace to the community. From these tests it was concluded that the mere substitution of quicklime and calcined dolomite for limestone and dolomite does not present sufficient advantages to compensate for the positive disadvantages. The result is that it has not been the practice to use the free oxides as a substitute for the usual raw materials.

It has also been proposed to increase the speed of fusion by the formation of granules of the raw materials and heating them to high temperatures before introduction into the furnace. In one of the proposed processes the sand and limestone are ground to very small dimension and the sodium carbonate added and a proportion of sodium hydroxide added to the batch and the batch then formed into granules and first dried and then heated to a high temperature approaching 700° C. This process is dependent on the very fine grinding of the sand and limestone. With the invention of the present process the sand and calcined limestone or dolomite can be used without special sizing and the product can be used either with or without drying.

Another proposal has been to produce soda lime by the reaction of caustic soda on quicklime and the production of a dry powder. This procedure requires higher temperatures and time to secure the type of product. The present invention does not require the heating of the materials and the time for reaction required in this proposal.

The present invention is based upon the discovery of a synergistic effect of the use of quicklime and/or calcined dolomite with a proportion of caustic alkali, which does not require either high temperatures or sizing of the material. The present invention permits a material increase in speed of fusion without the use of special equipment, or sizing of the material.

Among the objects of this invention is a batch of material which will accelerate the speed of fusion and fining of the glass, a method of preparation of a batch of material which will substantially reduce or eliminate the disadvantage arising from the use on fine powders of quicklime and calcined dolomite, and a batch of raw material which will achieve a previously unattainable uniformity of reaction with the ability to secure accurate reproducibility of results, and a batch of material which will produce a silicious glass of a quality equal or superior to that produced by fusion of limestone or dolomite, and a batch which will melt and fine more rapidly and thus reduce the size and cost of the melting furnaces of given output.

According to the invention a silicious glass of a given composition is made by replacing all or substantially all of the rock carbonates normally employed to supply the alkaline earth metal oxides with oxides of the alkaline earth and replacing a substantial part or all of the alkali metal carbonate or sulfate with the alkali metal hydroxide.

The objects of the invention include the formation of a batch of raw materials including all of the vitrifiable materials essential to the formation of the glass of the desired composition. This batch contains the silica, the alkaline earth metal oxides and the alkali metal hydroxides, and alkali metal sulfates and carbonates, and other oxide forming ingredients, in a form which can be readily handled and stored. The invention includes methods which enable one to form a batch containing a large proportion of alkali metal hydroxide without producing either a rapidly hardening mixture or a thin paste. This method may include either spraying the other components of the mixture with a hot concentrated spray of the alkali metal hydroxide, or by the addition of the solid particles of alkali metal hydroxide and limited quantities of water.

The process involves the replacement of all or substantially all the carbonates of the alkaline earth metals as found in the usual raw materials with their corresponding oxides per se and the replacement of a substantial part or all of the alkali metal salts such as the carbonates and sulfates with the corresponding alkali metal hydroxides. It should be noted that the mixture of silica sand and quicklime when exposed to moisture or mixed with water will form a mortar which will rapidly set to a hardened mass of cement. This hardening is accelerated by the presence of the very fine particles of the quicklime. By the substitution of a substantial part of the alkali metal salts by the alkali metal hydroxide either as a concentrated solution or as solid, the disadvantages in the use of quicklime are overcome.

In order to illustrate the advantages of this invention two different types of known glass were prepared. These glasses are normally prepared by melting sand, alumina, dolomite and/or limestone and alkali metal salts such as the sulfates and/or carbonates. The composition of the two glasses is set forth in the following table:

|  | Type I | Type II |
| --- | --- | --- |
| $SiO_2$ | 70.77% | 72.5% |
| $Al_2O_3$ | 1.10% | 1.2% |
| $Na_2O$ | 13.75% | 14.1% |
| CaO | 11.0% | 7.2% |
| MgO | 3.04% | 4.8% |
| Various oxides | 0.34% | 0.2% |

In Type I, the CaO and MgO are normally introduced as limestone and dolomite and in Type II the CaO and MgO are supplied solely as dolomite. The granulometry of the limestone and dolomite according to the prior art was between 0 and 1 mm.

The following examples in which the present invention was practiced show the production of glass having the composition of Type I. The eleven examples compare the time of melting and fining of a glass having this composition when prepared with all of the alkaline earth oxides being supplied as oxides per se and with varying percentages of the alkali metal oxides being supplied as hydroxides and the remainder thereof being supplied as alkali metal salts with the time of fusion and fining of a glass of this composition in which all of the alkaline earth oxide is from limestone and dolomite and all of the alkali metal oxide is supplied from salts.

In each of the examples given, the batch was composed of 700 kg. of silica sand, 11 kg. of alumina, 72.5 kg. of calcined dolomite and 68 kg. of quicklime and the quantities of sodium hydroxide supplying materials as given in the individual examples.

EXAMPLE 1

A standard mixer was supplied with the 700 kg. of sand, the 11 kg. of alumina, 72.5 kg. of calcined dolomite and 68 kg. of quicklime, and there was added 47 kg. of sodium sulfate, 164.5 kg. of sodium carbonate and 53 kg. of a 50% solution of caustic soda. This solution of caustic soda or lye supplied 15% of the total sodium oxide. The batch was mixed at room temperature. The caustic soda solution served to humidify the charge. The final batch was a powdery mass which could be fed into a furnace by common machinery. When this batch was fused and fined the operation took less time than with the standard batch of the same composition and gave a 19% increase in the speed of fusion.

EXAMPLE 2

The same materials in the same proportions as Example 1 were prepared and in this example the moist powder issuing from the mixer was passed to a rotating drum granulator and sprayed with 125 kg. of water while the drum was rotated. Granules having an average diameter of 8 mm. were obtained and these granules were dried by heating at 100° – 110° C and the dried granules were fed into the furnace. There was a further increase in speed of fusion, the increase as compared to the standard process was 40% and this represented an improvement of 21% over Example 1.

EXAMPLE 3

The same amount of sand, alumina, calcined dolomite and quicklime and sodium sulfate as in Example 1 was fed into the mixer, but the amount of sodium carbonate was reduced to 94.5 kg. from 164.5 kg. and 135 kg. of caustic soda solution of 70% concentration was used. The caustic soda supplied 45% of $Na_2O$ in the batch. The caustic soda solution was heated to 80° C before introduction into the mixer. The batch discharged from the mixer was humid and was put into the furnace with the usual machinery. This batch was melted and fined in a shorter time than the standard batch or the batch of Example 1. The speed of fusion was increased by 30% over the standard batch.

EXAMPLE 4

The same quantities of sand, alumina, calcined dolomite, quicklime and sodium sulfate and sodium carbonate as in Example 3 were fed into the mixer. The caustic soda solution was at a concentration at 41.5% requiring 250 kg. of the solution in place of 135 kg. used in Example 3 to supply the 45% of the sodium oxide. The mixing and material were at room temperature. The batch was a paste. The paste was extruded through an orifice of 1 cm. diameter and then the strips were cut into 2 cm. lengths to form granules. The granules were dried at 100° to 110° C. Part of the granules were stored, and part were immediately fed into a furnace. The stored material did not lump together but remained free flowing. The speed of fusion was increased by 55% over the standard batch.

EXAMPLE 5

The same quantities of silica sand, alumina, calcined dolomite, quicklime and sodium sulfate as in Example 1 were fed into the mixer. No sodium carbonate was used and 85% of the sodium oxide was supplied as caustic soda solution. This involved the addition of 216 kg. of a 70% concentrated solution caustic soda. The mixer and other ingredients were at room temperature and the caustic soda was heated to 80° C before being added. A slightly pasty mass was produced which could be fed into the furnace as usual. The speed of fusion was increased by 42%.

EXAMPLE 6

The same ingredients and in the same proportions as in Example 5 were made and the pasty mass produced was introduced into a rotary granulator as in Example 2. Eighty-five kg. of water were added to the granulator. Spherical granules of 12 mm. diameter were produced and these were dried at 100° to 110° C and then fed into the furnace. The speed of fusion as compared to the conventional process was increased by 70%.

EXAMPLE 7

The same quantities of silica sand, alumina, calcined dolomite, quicklime and sodium sulfate as in Example 5 were introduced into the mixer. Three hundred kg. of caustic soda solution of 50% concentration were added. The batch was a paste mass which was extruded through an orifice without adding water. The orifice had a diameter of 8 mm. and the extruded material was cut into 15 mm. lengths and dried. The speed of fusion was increased to 70% as compared to the standard batch.

EXAMPLE 8

In this example and the next three examples all of the sodium oxide was supplied as caustic soda and no sodium salts were employed.

In these examples the 700 kg. of sand, 11 kg. of alumina, 72.5 kg. of calcined dolomite and 68 kg. of quicklime are fed into the mixer. In this example the caustic soda was introduced as 254 kg. of a solution of 70% concentration. The dry ingredients were at room temperature and the caustic soda solution was heated to 80° C producing a pasty mass which could be introduced directly into the furnace. The increase in speed of melting was 45%.

EXAMPLE 9

The steps of Example 8 were repeated and the pasty mass which issued from the mixer was fed into a rotary drum granulator and 74 kg. of water was added. Spherical granules of 10 mm. diameter were made and these were dried at between 100° C and 110° C before storage or fusion. When fed into a furnace the dried granules gave an increased speed of fusion of 80%.

EXAMPLE 10

The same quantities of silica sand, alumina, calcined dolomite and quicklime as set forth in Example 8 were fed into the mixer and 178 kg. of caustic soda flakes and 22 kg. of water were added. The materials were at room temperature. The product was a powdery mass which was introduced into the furnace with the usual machinery. The speed of fusion was increased by 45%.

EXAMPLE 11

The same quantities of silica sand, alumina, calcined dolomite, and quicklime as set forth in Example 8 were introduced into the mixer and 156 kg. of solid caustic soda flakes and 44 kg. of a 50% caustic soda solution was added to the mixer. The product was a powder which was fed directly into the furnace. This batch gave an increase in speed of 45% as compared to the conventional batch.

The results of the eleven tests are summarized in the following table:

TABLE I

| Ex. No. | $SiO_2$ kg. | MgO+CaO kg. | $Al_2O_3$ kg. | CaO kg. | $Na_2SO_4$ kg. | $Na_2CO_3$ kg. | NaOH kg. | % $Na_2O$ supplied as NaOH | $H_2O$ kg. | Speed increase % | Form |
|---|---|---|---|---|---|---|---|---|---|---|---|
| 1. | 700 | 72.5 | 11 | 68 | 47 | 164 | 26.5 | 15 | 26.5 | 19 | powder |
| 2. | " | " | " | " | " | " | " | " | 151 | 40 | granules |
| 3. | " | " | " | " | " | 94.5 | 94.5 | 45 | 40.5 | 30 | humid |
| 4. | " | " | " | " | " | " | " | " | 125 | 55 | paste |
| 5. | " | " | " | " | " | 0 | 151 | 85 | 65 | 42 | paste |
| 6. | " | " | " | " | " | " | " | " | 150 | 70 | granules |
| 7. | " | " | " | " | " | " | " | " | 150 | 70 | granules |
| 8. | " | " | " | " | 0 | 0 | 178 | 100 | 76 | 45 | powder |
| 9. | " | " | " | " | " | " | " | " | 150 | 80 | granules |
| 10. | " | " | " | " | " | " | " | " | 22 | 45 | powder |
| 11. | " | " | " | " | " | " | " | " | 22 | 45 | powder |

It will be seen from the above examples and table that from 15 to 100% by weight of the alkali metal was supplied by the alkali metal hydroxide, sodium hydroxide. It will also be seen that the concentrations of the aqueous solutions of sodium hydroxide varied in the range from about 50 to about 75%.

The replacement of the carbonates and sulfates of sodium by a caustic soda solution can be easily accomplished as long as the degree of replacement does not exceed 15 to 18% of the sodium oxide in the glass. Above this percentage of replacement, the amount of ordinary solution to be added becomes so great that the mixture becomes too soft to be handled properly and the amount of water is too great to be used with the quicklime. If more than 15 to 18% of the sodium oxide is to be supplied by a caustic solution it is necessary to use a caustic soda solution containing at least 40% by weight and preferably between 60 and 75% of caustic soda. Above this percentage the caustic soda solutions are not liquid at room temperature and must be heated to become liquid which can be used. If large quantities of water are added in the mixer the batch will be too wet and would require heating to drive off the water before being fed to the furnace. This would cause a rapid solidification of the mass due to the hardening of quicklime particularly in the presence of carbonates.

Figure 2:
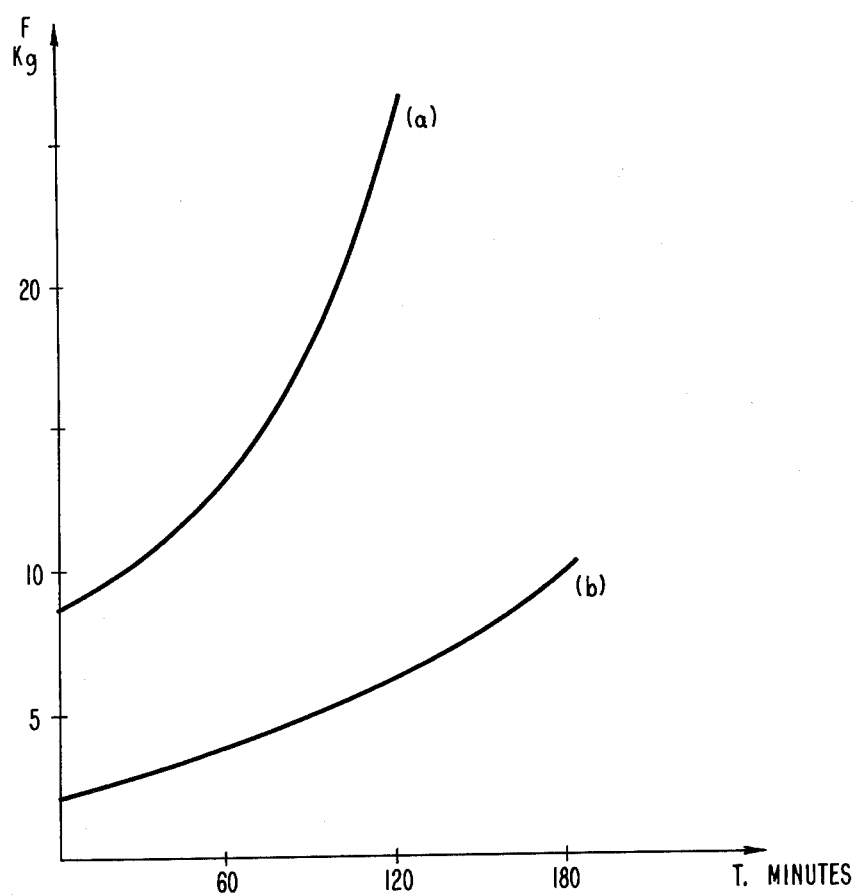

The drawing contains FIGS. 1 and 2 which are illustrative of the curves of the results of the process.

FIG. 1 contains Curves in which the oridinates show the increase in melting speed and the abscissas show the proportion of the sodium salts which has been replaced by NaOH.

FIG. 2 contains plots of curves in which the abscissas show the duration T of storage after mixing and the ordinates show the hardness expressed in the weight F in kg. necessary to inject 80 mm. of a cone having a base of thirty mm. and a height of 120 mm. into the batch at a temperature of 55° C.

In preparing the curves shown in the drawing and in determining the fusion time in the examples, the rate of fusion was determined by the method established at the Seventh International Congress of Glass at Brussels in 1965. In the drawing Curve I shows the increase in speed of melting of a glass of type I and curve II shows a similar increase for a glass of type II as a function of the degree of substitution of caustic soda for carbonate and sulfate salts of sodium, in a glass batch in which the alkaline earth metal oxides are supplied by limestone and dolomite. Curves I$a$ and II$a$ represent the shape of the curve which would be expected from the substitution of quicklime and calcined dolomite for all of the limestone and dolomite. That is, it would be expected that the result of the substitution of quicklime and calcined dolomite would have been expected to increase the speed of fusion by only about 12%, since this increase in speed is that which is normally obtained in these types of glasses by this substitution.

Curves I$b$ and II$b$ are the plots of the results which are obtained by the tests of using batches to produce glasses of Types I and II in which the alkaline earth oxides are furnished by either calcined dolomite or a mixture of calcined dolomite and quicklime and varying the proportion of NaOH used to supply the necessary alkali metal oxide. It is a surprising discovery that in accomplishing this substitution of all of the alkaline earth carbonates in limestone and dolomite by the corresponding calcined dolomite and quicklime, and varying the proportion of caustic soda from 0 to 100%, one does not produce a curve similar to II and II such as I$a$ and II$b$. As is readily seen curves obtained in actual test have a different and approximately linear shape with a slope which increases rapidly as the sodium salts are replaced by caustic soda.

It is to be observed that by replacing more than 30% of the sodium salt by caustic soda, with the use of alkaline earth oxides one obtains an increase in speed of fusion of 45 to 50%, and by following the further steps taught by the Examples one can obtain an increase up to 80%. However, when caustic soda is used with crude limestone and dolomite, the effect of the substitution of caustic soda for sodium salts, the effect of the substitution increases rapidly up to about 25 to 30% substitution and thereafter levels off without any substantial gain with further increase in the degree of substitution. The maximum gain is in the order of 12 to 15%.

The substitution of caustic soda for sodium salts with corresponding use of alkaline earth oxides also increases the speed of fining consistently with the degree of substitution of the caustic soda. When caustic soda is substituted for sodium salts and the batch contains raw limestone and dolomite, the speed of fining does not increase after the substitution of about 25% of the sodium salts by caustic alkali.

It has been established that the presence of very fine or dust-like particles of alkaline earth oxides is very harmful to fining when sodium salts are used to supply the sodium oxides. However, when the sodium salts are substituted by caustic soda in substantial part or totally, the fine particles of alkaline earth oxide do not interfere with the fining. This permits the present process to use quicklime and calcined dolomite containing substantial proportions of very fine and dust-like particles. Thus it is unnecessary to screen the quicklime and calcined dolomite as was necessary in the prior art. Furthermore, the use of caustic soda eliminates the evolution of the lime dust in the mixing and in the melting.

The batch of the present process does not harden as rapidly as do batches which are prepared from raw limestone and dolomite and caustic soda. The present process produces batches which can be held in storage for much longer periods. Thus, with compositions for making glass of Type II in which the total sodium oxide is introduced as a slurry of 70% concentration and at 80° C, one obtains the hardening curve $a$ of FIG. 2. In this curve the abscissas shows the duration T of storage after mixing and the ordinates express the weight F in kg necessary to inject 800 mm. of a cone having a base of 300 mm. and a height of 120 mm. in the charge, at a temperature of 55° C.

The curve $b$ of FIG. 2 represents the values if a batch is prepared from the corresponding alkaline earth oxides and the same solution of caustic soda. It is apparent from the curves $a$ and $b$ that the charge containing the alkaline earth carbonates hardens very rapidly and cannot be used satisfactorily in ordinary glass making installation, whereas the charge containing quicklime and/or calcined dolomite remains plastic for several hours and can be held in storage before being fed into the melting furnaces. The present invention shows that it is possible to use concentrated solutions of caustic soda by heating these solutions to liquid form. It is to be observed that while the specification has been directed to specific examples in which the alkaline earth metal is calcium and the alkali metal is sodium, other alkaline earth metal oxides such as those of magnesium can be used and other alkali metal hydroxides such as potassium hydroxide and lithium hydroxide can be used.

The invention shows that it is possible to introduce a very concentrated and hot caustic solution such as one containing 70% by weight of sodium hydroxide at a temperature of 80° C or higher although it is preferable not to heat over 75° C. These solutions can be sprayed when they are heated to 80° C or more on a charge at room temperature or between about 20° and 50° C without producing an excessively wet or dry powdery mass when the batch is returned to room temperature. The moist characteristics of such a batch or charge is surprising since a 70% caustic soda solution is solid at these temperatures. The invention also permits the use of solid 100% caustic soda to supply part or all of the sodium oxide, with a small amount of free water. The batch can be shaped by extrusion as a plastic mass or by granulation with or without the addition of water and then dried to produce a granular material which can be readily handled and which will not set up into a mass.

As many widely different embodiments of the present invention may be made without departing from the spirit and scope of the invention, it is to be understood that the invention is not limited to the specific embodiments of the examples.

What is claimed is:

1. The method of preparing a vitrifiable charge for the manufacture of silicon-sodium-calcium glass which comprises mixing at room temperature into a homogeneous mass sand, quicklime, and calcined dolomite, incorporating in the mixture an alkali metal supplying material including alkali metal hydroxide, from 15 to 100% by weight of the alkali metal being supplied by said alkali metal hydroxide, and a quantity of water sufficient to permit granulation of the mixture.

2. A method according to claim 1 wherein said material comprises an aqueous solution containing at least 40% by weight of sodium hydroxide.

3. A method according to claim 1 wherein said material is a solid.

4. A method according to claim 1 wherein said material consists essentially of caustic soda in flake form at essentially 100% concentration of sodium hydroxide.

5. A method according to claim 1 wherein said material comprises a slurry containing from about 60 to 75% by weight of sodium hydroxide heated to a temperature not in excess of 75° C and wherein the sand, quicklime, and calcined dolomite are at room temperature.

* * * * *

UNITED STATES PATENT AND TRADEMARK OFFICE
CERTIFICATE OF CORRECTION

PATENT NO. : 4,028,131
DATED : June 7, 1977
INVENTOR(S) : Andre Pons

It is certified that error appears in the above-identified patent and that said Letters Patent are hereby corrected as shown below:

Column 4, line 43, "concentration at" should be -- concentration of --;

Signed and Sealed this

Third Day of January 1978

[SEAL]

Attest:

RUTH C. MASON
*Attesting Officer*

LUTRELLE F. PARKER
*Acting Commissioner of Patents and Trademarks*